No. 657,552.  
W. LINHART.  
AXLE OILER.  
(Application filed Jan. 30, 1900.)  
Patented Sept. 11, 1900.
(No Model.)
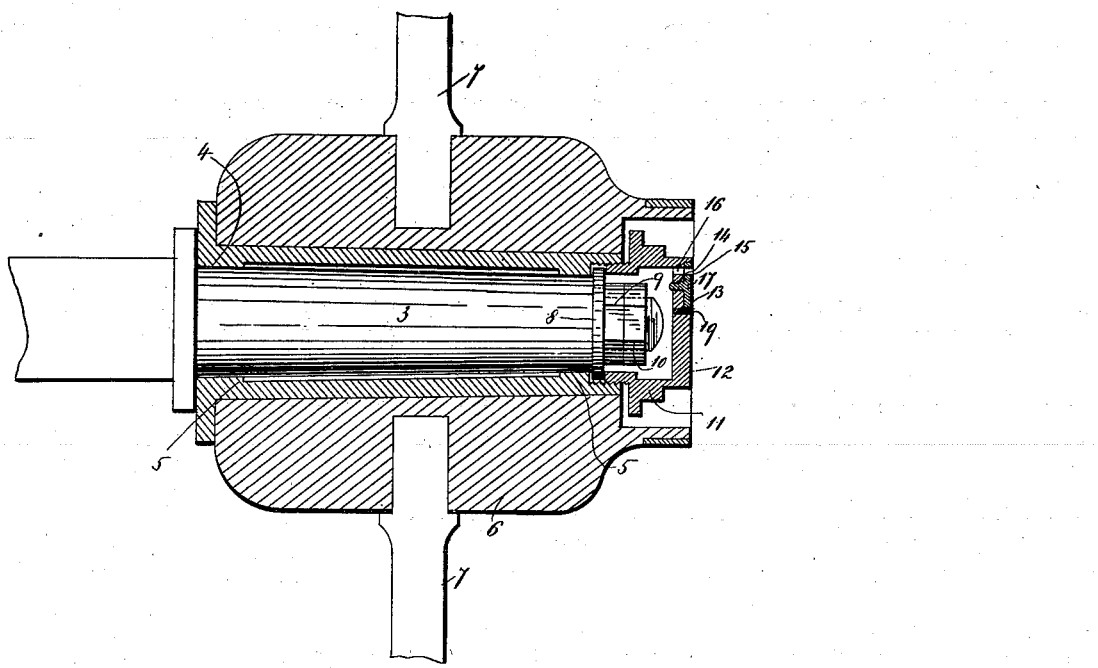
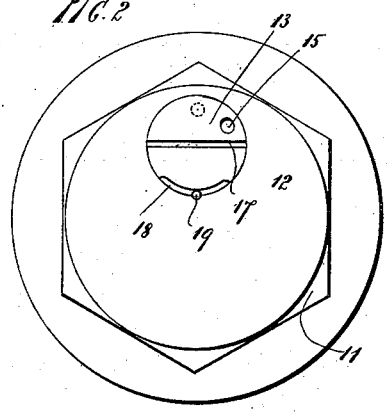

UNITED STATES PATENT OFFICE.

WILLIAM LINHART, OF NEW YORK, N. Y.

AXLE-OILER.

SPECIFICATION forming part of Letters Patent No. 657,552, dated September 11, 1900.

Application filed January 30, 1900. Serial No. 3,282. (No model.)

*To all whom it may concern:*

Be it known that I, WILLIAM LINHART, a citizen of the United States, residing at New York, in the county of New York and State of New York, have invented certain new and useful Improvements in Axle-Oilers, of which the following is a full and complete specification, such as will enable those skilled in the art to which it appertains to make and use the same.

This invention relates to devices for permitting introduction of oil to axles, and more particularly the axles of vehicle-wheels; and the object thereof is to provide devices whereby axles may be oiled without the removal of the cap-nut which closes the axle-box. Customarily the cap-nut is detached and a quantity of axle-grease or other lubricant is smeared upon the end of the axle. This operation requires the use of a wrench or other tool, which is not always at hand and the application of which is attended with inconvenience and various disadvantages, which it is the object of this invention to obviate.

My invention consists in the construction and arrangement of parts hereinafter described.

In the accompanying drawings, forming part of this specification, in which like reference characters denote corresponding parts in both views, Figure 1 is a longitudinal section, partly in full lines, of a wheel-hub, showing my improved means for oiling the axle thereof; and Fig. 2, an end view thereof upon an enlarged scale.

In the practice of my invention I employ the usual or any preferred form of axle 3, which is mounted in the axle-box 4, provided with bearings 5 and itself fixed in the wheel-hub 6, which carries the spokes 7. The axle 3 is provided at the outer end with the usual washer 8 and lock-nuts 9 and 10, whereby the said washer is maintained in position to prevent longitudinal detachment of the axle from the axle-box. Into the outer end of the axle-box 4 is screwed the usual cap-nut 11, which incloses the outer end of the axle and the lock-nuts 9 and 10 in the customary manner and which is customarily detached to allow introduction of the lubricant to the axle. The above construction does not form part of my invention, but only illustrates a form of construction to which my invention may be applied.

In the specific practice of my invention I recess a portion of the cap-nut 11, at the crown 12 thereof, and centrally therein I mount a circular disk 13, by means of a threaded stud 14, and the disk 13 is provided with a transverse opening 15, arranged eccentrically thereof. The cap-nut 11 is provided with a transverse opening 16, in the crown 12 thereof, in position to register with the opening 15 upon revolution of the disk 13, and the disk 13 is provided with a transverse groove 17, which is adapted to receive a screw-driver or other similar tool. The disk 13 is provided with a segmentally-cut-away portion, adjacent the periphery thereof, at 18, and fixed to the crown 12 and operating within the cut-away portion 18 is a stop-pin 19, which limits the revoluble play of the disk 13. The relative arrangement of the opening 15 and cut-away portion 18 in the disk 13 and the opening 16 and pin 19 in the crown 12 are such that the openings 15 and 16 will come into registration preferably directly above the central point in the crown 12, whereby oil introduced through the latter openings will fall by gravity into the interior of the cap-nut 11 and fill the recess therein. Furthermore, the pin 19 will engage one end wall of the cut-away portion 18 at the precise phase of revolution of the disk 13 at which the openings 15 and 16 are in registration. The pin 19 also prevents detachment of the disk 13, limiting, as it does, the revoluble play thereof.

It is manifest that to obtain access to the end of the axle 3 for oiling the same all that is necessary is to sufficiently turn the disk 13 to bring the openings 15 and 16 into registration, when oil or other lubricant may be introduced therethrough. The disk 13 is then turned back to an extent limited by the pin 19, moving the openings 15 and 16 out of registration and preventing egress or exit into or from the interior of the cap-nut. A screw-driver, knife-blade end, or other suitable implement may be employed to operate within the groove 17 and turn the disk 13.

Having fully described my invention, I claim as new and desire to secure by Letters Patent—

1. An axle-lubricator, comprising a cap-nut within which the end of the axle projects, there being a transverse opening formed through the crown thereof, a disk provided with a threaded stud which is screwed into the crown of said cap-nut and having a transverse opening arranged to be brought into registration with the opening in said cap-nut, said disk being provided with a segmentally-cut-away portion, and a stop-pin fixed to the crown of said cap-nut and projecting through said cut-away portion of said disk, and whereby the revoluble play of said disk is limited, substantially as shown and described.

2. An axle-lubricator, comprising a cap-nut within which the end of the axle projects, there being a transverse opening formed through the crown thereof, a disk provided with a threaded stud which is screwed into the crown of said cap-nut and having a transverse opening arranged to be brought into registration with the opening in said cap-nut, said disk being provided with a segmentally-cut-away portion, and with a transverse groove adapted to receive a screw-driver or other implement, and a stop-pin fixed to the crown of said cap-nut and projecting through said cut-away portion of said disk, and whereby the revoluble play of said disk is limited, substantially as shown and described.

In testimony that I claim the foregoing as my invention I have signed my name, in presence of the subscribing witnesses, this 29th day of January, 1900.

WILLIAM LINHART.

Witnesses:
F. A. STEWART,
V. M. VOSLER.